US008050916B2

(12) United States Patent
Liu et al.

(10) Patent No.: US 8,050,916 B2
(45) Date of Patent: Nov. 1, 2011

(54) SIGNAL CLASSIFYING METHOD AND APPARATUS

(75) Inventors: Yuanyuan Liu, Shenzhen (CN); Zhe Wang, Shenzhen (CN); Eyal Shlomot, Long Beach, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/085,149

(22) Filed: Apr. 12, 2011

(65) Prior Publication Data

US 2011/0178796 A1 Jul. 21, 2011

Related U.S. Application Data

(63) Continuation of application No. 12/979,994, filed on Dec. 28, 2010.

(30) Foreign Application Priority Data

Oct. 15, 2009 (CN) .......................... 2009 1 0110798
Aug. 31, 2010 (WO) ................ PCT/CN2010/076499

(51) Int. Cl.
*G10L 15/20* (2006.01)
*G10L 11/04* (2006.01)
*G10L 15/04* (2006.01)

(52) U.S. Cl. ......... 704/233; 704/206; 704/253; 381/110

(58) Field of Classification Search ........................ None
See application file for complete search history.

(56) References Cited

U.S. PATENT DOCUMENTS 5,712,953 A 1/1998 Langs
5,732,392 A 3/1998 Mizuno et al.
(Continued)

FOREIGN PATENT DOCUMENTS

CN 1354455 A 6/2002
(Continued)

OTHER PUBLICATIONS

Foreign communication from a counterpart application, PCT application PCT/CN2010/076499, International Search Report and Written Opinion dated Oct. 15, 2009.

(Continued)

*Primary Examiner* — Brian Albertalli
(74) *Attorney, Agent, or Firm* — Conley Rose, P.C.; Grant Rodolph

(57) ABSTRACT

A signal classifying method and apparatus are disclosed. The signal classifying method includes: obtaining a spectrum fluctuation parameter of a current signal frame determined as a foreground frame, and buffering the spectrum fluctuation parameter; obtaining a spectrum fluctuation variance of the current signal frame according to spectrum fluctuation parameters of all buffered signal frames, and buffering the spectrum fluctuation variance; and calculating a ratio of signal frames whose spectrum fluctuation variance is above or equal to a first threshold to all the buffered signal frames, and determining the current signal frame as a speech frame if the ratio is above or equal to a second threshold or determining the current signal frame as a music frame if the ratio is below the second threshold. In the embodiments of the present invention, the spectrum fluctuation variance of the signal is used as a parameter for classifying the signals, and a local statistical method is applied to decide the type of the signal. Therefore, the signals are classified with few parameters, simple logical relations and low complexity.

13 Claims, 9 Drawing Sheets

U.S. PATENT DOCUMENTS

| | | | | |
|---|---|---|---|---|
| 6,570,991 | B1 * | 5/2003 | Scheirer et al. | 381/110 |
| 6,785,645 | B2 * | 8/2004 | Khalil et al. | 704/216 |
| 7,179,980 | B2 * | 2/2007 | Kirkeby et al. | 84/600 |
| 7,328,149 | B2 * | 2/2008 | Jiang et al. | 704/207 |
| 7,346,516 | B2 | 3/2008 | Sall et al. | |
| 7,809,560 | B2 | 10/2010 | Yen et al. | |
| 7,844,452 | B2 | 11/2010 | Takeuchi et al. | |
| 7,858,868 | B2 * | 12/2010 | Kemp et al. | 84/615 |
| 7,864,967 | B2 * | 1/2011 | Takeuchi et al. | 381/56 |
| 2002/0172372 | A1 | 11/2002 | Tagawa et al. | |
| 2003/0101050 | A1 | 5/2003 | Khalil et al. | |
| 2007/0136053 | A1 | 6/2007 | Ebenezer | |
| 2008/0082323 | A1 | 4/2008 | Bai et al. | |

FOREIGN PATENT DOCUMENTS

| | | | |
|---|---|---|---|
| CN | 1815550 | A | 8/2006 |
| CN | 101256772 | A | 9/2008 |
| EP | 0764937 | A2 | 3/1997 |
| EP | 1244093 | A2 | 3/2002 |
| WO | 2007106384 | A1 | 9/2007 |
| WO | 2008106852 | A1 | 9/2008 |

OTHER PUBLICATIONS

Foreign communication from a counterpart application, PCT application PCT/CN2010/076499, Partial English Translation Written Opinion dated Oct. 15, 2009.

Jia, Lan-Ian, "A Fast and Robust Speech/Music Discrimination Approach," Information and Electronic Egineering, vol. 6, No. 4, Aug. 2008.

Foreign communication from a counterpart application, Chinese application CN200910110798.4, Partial English Translation Office Action dated Jul. 8, 2011, 1 page.

Foreign communication from a counterpart application, European application 10790605.9, Extended European Search Report dated Aug. 18, 2011, 9 pages.

Foreign communication from a counterpart application, Chinese application CN200910110798.4, Office Action dated Jul. 8, 2011, 3 pages.

Huang, et al., "Advances in Unsupervised Audio Classification and Segmentation for the Broadcast News and NGSW Corpora", IEEE Transactions on Audio, Speech, and Language Processing, vol. 14, No. 3, May 1, 2006, pp. 907-919.

Wang Zhe, Proposed Text for Draft new ITU-T Recommendation G.GSAD a Generic Sound Activity Detectora; C 348:, ITU-T Drafts; Study Period 2009-2012, Oct. 18, 2009, pp. 1-14.

"3rd Generation Partnership Project; Technical Specification Services and System Aspects; Mandatory Speech Codec Speech Processing Functions; Adaptive Multi-Rate (AMR) Speech Codec; Voice Activity Detector (VAD)" (Release 8), Dec. 2008, 25 pgs.

Itut, "Series G: Transmission Systems and Media, Digital Systems and Networks, Digital Terminal Equipments-Coding of Voice and Audio Signals, Generic Sound Activity Detector; (GSAD)", G720.1, Jan. 2010, 26 pages.

* cited by examiner

SIGNAL CLASSIFYING METHOD AND APPARATUS

CROSS-REFERENCE TO RELATED APPLICATIONS

This application is a continuation of U.S. patent application Ser. No. 12/979,994, filed on Dec. 28, 2010, which is a continuation of International Patent Application No. PCT/CN2010/076499, filed on Aug. 31, 2010, which claims priority to Chinese Patent Application No. 200910110798.4, filed on Oct. 15, 2009, all of which are hereby incorporated by reference in their entireties.

FIELD OF THE INVENTION

The present invention relates to communication technologies, and in particular, to a signal classifying method and apparatus.

BACKGROUND OF THE INVENTION

Speech coding technologies can compress speech signals to save transmission bandwidth and increase the capacity of a communication system. With the popularity of the Internet and the expansion of the communication field, the speech coding technologies are a focus of standardization in China and around the world. Speech coders are developing toward multi-rate and wideband, and the input signals of speech coders are diversified, including music and other signals. People require higher and higher quality of conversation, especially the quality of music signals. For different input signals, coders of different coding rates and even different core coding algorithms are applied to ensure the coding quality of different types of signals and save bandwidth to the utmost extent, which has become a megatrend of speech coders. Therefore, identifying the type of input signals accurately becomes a hot topic of research in the communication industry.

A decision tree is a method widely used for classifying signals. A long-term decision tree and a short-term decision tree are used together to decide the type of signals. First, a First-In First-Out (FIFO) memory of a specific time length is set for buffering short-term signal characteristic variables. The long-term signal characteristics are calculated according to the short-term signal characteristic variables of the same time length as the previous one, where the same time length as the previous one includes the current frame; and the speech signals and music signals are classified according to the calculated long-term signal characteristics. In the same time length before the signals begin, namely, before the FIFO memory is full, a decision is made according to the short-term signal characteristics. In both the short-term decision and the long-term decision, the decision trees shown in FIG. 1 and FIG. 2 are applied.

In the process of developing the present invention, the inventor finds that the signal classifying method based on a decision tree is complex, involving too much calculation of parameters and logical branches.

SUMMARY OF THE INVENTION

The embodiments of the present invention provide a signal classifying method and apparatus so that signals are classified with few parameters, simple logical relations and low complexity.

A signal classifying method provided in an embodiment of the present invention includes: obtaining a spectrum fluctuation parameter of a current signal frame; buffering the spectrum fluctuation parameter of the current signal frame in a first buffer array if the current signal frame is a foreground frame; if the current signal frame falls within a first number of initial signal frames, setting a spectrum fluctuation variance of the current signal frame to a specific value and buffering the spectrum fluctuation variance of the current signal frame in a second buffer array; otherwise, obtaining the spectrum fluctuation variance of the current signal frame according to spectrum fluctuation parameters of all signal frames buffered in the first buffer array and buffering the spectrum fluctuation variance of the current signal frame in the second buffer array; and calculating a ratio of signal frames whose spectrum fluctuation variance is above or equal to a first threshold to all signal frames buffered in the second buffer array, and determining the current signal frame as a speech frame if the ratio is above or equal to a second threshold or determining the current signal frame as a music frame if the ratio is below the second threshold.

Another signal classifying method provided in an embodiment of the present invention includes: obtaining a spectrum fluctuation parameter of a current signal frame determined as a foreground frame, and buffering the spectrum fluctuation parameter; obtaining a spectrum fluctuation variance of the current signal frame according to spectrum fluctuation parameters of all buffered signal frames, and buffering the spectrum fluctuation variance; and calculating a ratio of signal frames whose spectrum fluctuation variance is above or equal to a first threshold to all the buffered signal frames, and determining the current signal frame as a speech frame if the ratio is above or equal to a second threshold or determining the current signal frame as a music frame if the ratio is below the second threshold.

A signal classifying apparatus provided in an embodiment of the present invention includes: a first obtaining module, configured to obtain a spectrum fluctuation parameter of a current signal frame; a foreground frame determining module, configured to determine the current signal frame as a foreground frame and buffer the spectrum fluctuation parameter of the current signal frame determined as the foreground frame into a first buffering module; the first buffering module, configured to buffer the spectrum fluctuation parameter of the current signal frame determined by the foreground frame determining module; a setting module, configured to set a spectrum fluctuation variance of the current signal frame to a specific value and buffer the spectrum fluctuation variance in a second buffering module if the current signal frame falls within a first number of initial signal frames; a second obtaining module, configured to obtain the spectrum fluctuation variance of the current signal frame according to spectrum fluctuation parameters of all signal frames buffered in the first buffering module and buffer the spectrum fluctuation variance of the current signal frame in the second buffering module if the current signal frame falls outside the first number of initial signal frames; the second buffering module, configured to buffer the spectrum fluctuation variance of the current signal frame set by the setting module or obtained by the second obtaining module; and a first deciding module, configured to: calculate a ratio of signal frames whose spectrum fluctuation variance is above or equal to a first threshold to all signal frames buffered in the second buffering module, and determine the current signal frame as a speech frame if the ratio is above or equal to a second threshold or determine the current signal frame as a music frame if the ratio is below the second threshold.

Another signal classifying apparatus provided in an embodiment of the present invention includes: a third obtaining module, configured to obtain a spectrum fluctuation parameter of a current signal frame determined as a foreground frame, and buffer the spectrum fluctuation parameter; a fourth obtaining module, configured to obtain a spectrum fluctuation variance of the current signal frame according to the spectrum fluctuation parameters of all signal frames buffered in the third obtaining module, and buffer the spectrum fluctuation variance; and a third deciding module, configured to: calculate a ratio of signal frames whose spectrum fluctuation variance is above or equal to a first threshold to all signal frames buffered in the fourth obtaining module, and determine the current signal frame as a speech frame if the ratio is above or equal to a second threshold or determine the current signal frame as a music frame if the ratio is below the second threshold.

In the technical solution under the present invention, the spectrum fluctuation parameter of the current signal frame is obtained; if the current signal frame is a foreground frame, the spectrum fluctuation parameter of the current signal frame is buffered in the first buffer array; if the current signal frame falls within a first number of initial signal frames, the spectrum fluctuation variance of the current signal frame is set to a specific value, and is buffered in the second buffer array; if the current signal frame falls outside the first number of initial signal frames, the spectrum fluctuation variance of the current signal frame is obtained according to the spectrum fluctuation parameters of all buffered signal frames, and is buffered in the second buffer array. The signal spectrum fluctuation variance serves as a parameter for classifying signals, and the local statistical method is applied to decide the signal type. Therefore, the signals are classified with few parameters, simple logical relations and low complexity.

BRIEF DESCRIPTION OF THE DRAWINGS

To describe the technical solution under the present invention more clearly, the following outlines the accompanying drawings involved in the embodiments of the present invention. Apparently, the accompanying drawings outlined below are not exhaustive, and persons of ordinary skill in the art can derive other drawings from such accompanying drawings without any creative effort.

DETAILED DESCRIPTION OF THE EMBODIMENTS

The following detailed description is given with reference to the accompanying drawings to provide a thorough understanding of the present invention. Evidently, the drawings and the detailed description are merely representative of particular embodiments of the present invention, and the embodiments are illustrative in nature and not exhaustive. All other embodiments, which can be derived by those skilled in the art from the embodiments given herein without any creative effort, shall fall within the scope of the present invention.

Figure 1:
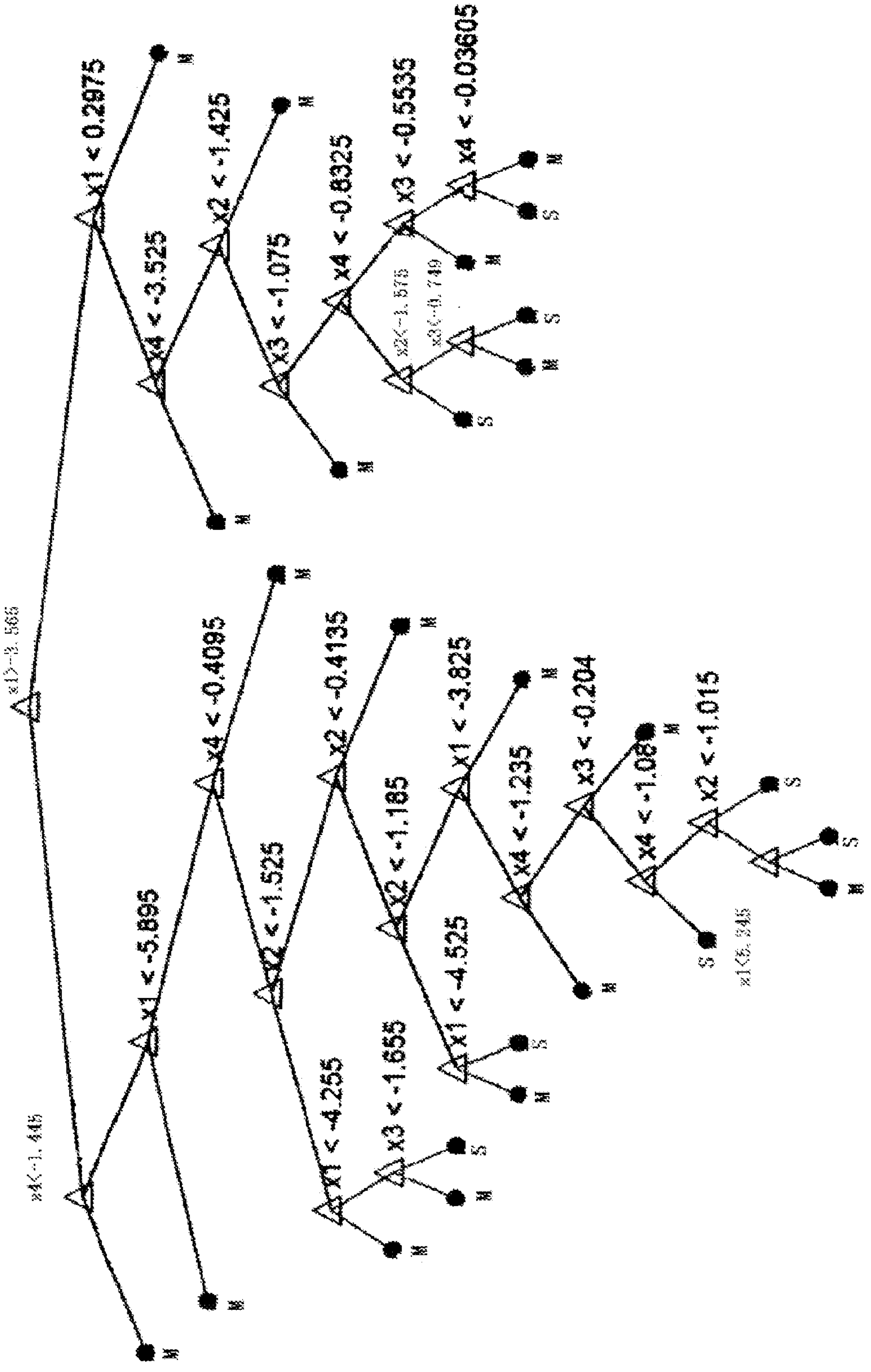
FIG. 1 shows how to classify signals through a short-term decision tree in the prior art.
Figure 2:
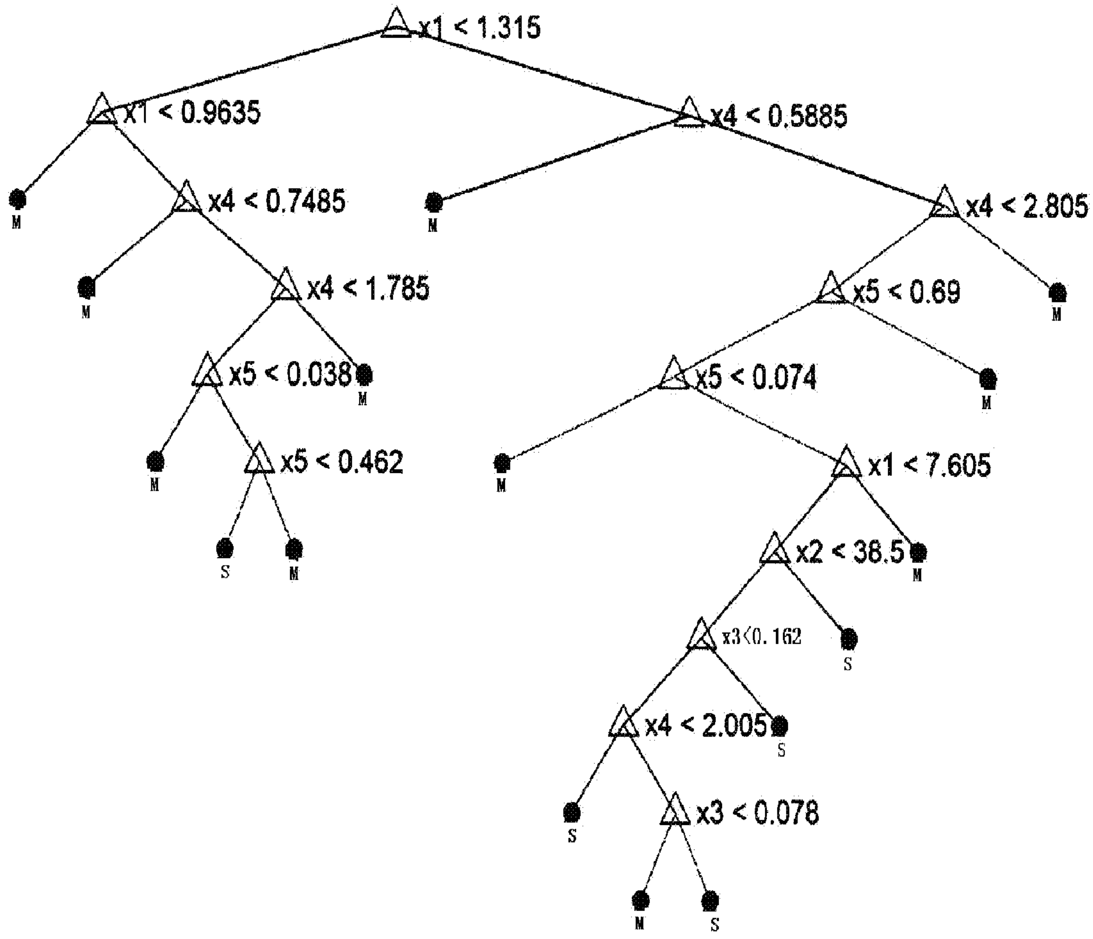
FIG. 2 shows how to classify signals through a long-term decision tree in the prior art.
Figure 3:
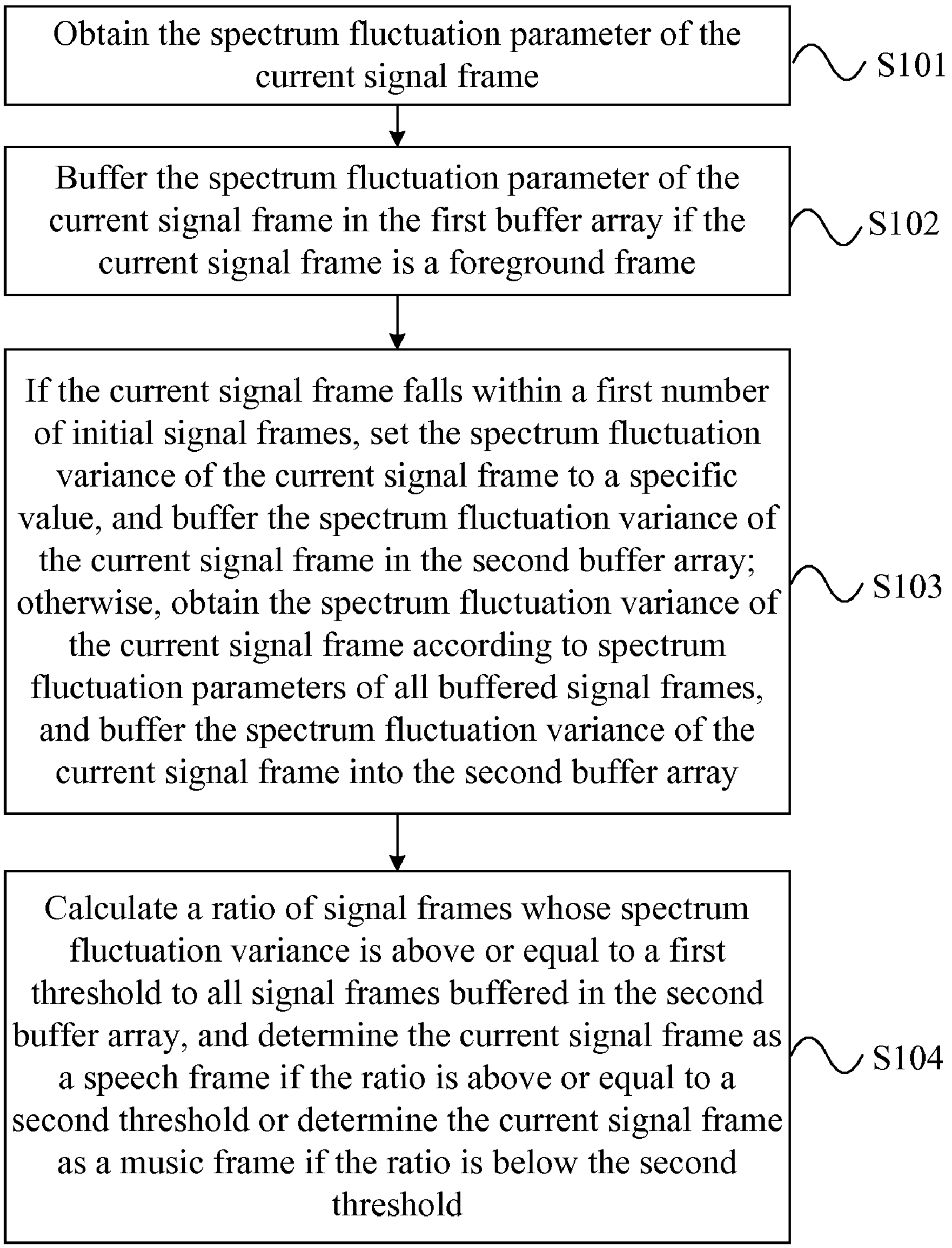
FIG. 3 is a flowchart of a signal classifying method according to an embodiment of the present invention.

FIG. 3 is a flowchart of a signal classifying method in an embodiment of the present invention. As shown in FIG. 3, the method includes the following steps:

S101. Obtain a spectrum fluctuation parameter of a current signal frame.

In this embodiment, an input signal is framed to generate a certain number of signal frames. If the type of a signal frame currently being processed needs to be identified, this signal frame is called a current signal frame. Framing is a universal concept in the digital signal processing, and refers to dividing a long segment of signals into several short segments of signals.

The current signal frame undergoes time-frequency transform to form a signal spectrum, and the spectrum fluctuation parameter (flux) of the current signal frame is calculated according to the spectrum of the current signal frame and several previous signal frames.

S102. Buffer the spectrum fluctuation parameter of the current signal frame in a first buffer array if the current signal frame is a foreground frame.

In this embodiment, the types of a signal frame include foreground frame and background frame. A foreground frame generally refers to the signal frame with high energy in the communication process, for example, the signal frame of a conversation between two or more parties or signal frame of music played in the communication process such as a ring back tone. A background frame generally refers to the noise background of the conversation or music in the communication process. The signal classifying in this embodiment refers to identifying the type of the signal in the foreground frame. Before the signal classifying, it is necessary to determine whether the current signal frame is a foreground frame.

If the current signal frame is a foreground frame, the spectrum fluctuation parameter (flux) of the current signal frame needs to be buffered. In this embodiment, a spectrum fluctuation parameter buffer array (flux_buf) may be set, and this array is referred to as a first buffer array below. The flux_buf array is updated when the signal frame is a foreground frame, and the first buffer array can buffer a first number of signal frames.

In this embodiment, the step of obtaining the spectrum fluctuation parameter of the current signal frame and the step of determining the current signal frame as a foreground frame are not order-sensitive. Any variations of the embodiments of the present invention without departing from the essence of the present invention shall fall within the scope of the present invention.

S103. If the current signal frame falls within a first number of initial signal frames, set a spectrum fluctuation variance of the current signal frame to a specific value and buffer the spectrum fluctuation variance of the current signal frame in a second buffer array; otherwise, obtain the spectrum fluctuation variance of the current signal frame according to spectrum fluctuation parameters of all buffered signal frames and buffer the spectrum fluctuation variance of the current signal frame in the second buffer array.

In this embodiment, a spectrum fluctuation variance $var\_flux_n$ may be obtained according to whether the first buffer array is full, where $var\_flux_n$ is a spectrum fluctuation variance of frame n.

Supposing that the first number is $m_1$, if the current signal frame falls between frame 1 and frame $m_1$, the spectrum fluctuation variance of the current signal frame is set to a specific value; if the current signal frame does not fall between frame 1 and frame $m_1$, but falls within the signal frames that begin with frame $m_1+1$, the spectrum fluctuation variance of the current signal frame can be obtained according to the flux of the $m_1$ signal frames buffered.

After the spectrum fluctuation variance of the current signal frame is obtained, the spectrum fluctuation variance needs to be buffered. In this embodiment, a spectrum fluctuation variance buffer array (var_flux_buf) may be set, and this array is referred to as a second buffer array below. The var_flux_buf is updated when the signal frame is a foreground frame.

S104. Calculate a ratio of signal frames whose spectrum fluctuation variance is above or equal to a first threshold to all signal frames buffered in the second buffer array, and determine the current signal frame as a speech frame if the ratio is above or equal to a second threshold or determine the current signal frame as a music frame if the ratio is below the second threshold.

In this embodiment, var_flux may be used as a parameter for deciding whether the signal is speech or music. After the current signal frame is determined as a foreground frame, a judgment may be made on the basis of a ratio of the signal frames, whose var_flux is above or equal to a threshold, to the signal frames buffered in the var_flux_buf array (including the current signal frame), so as to determine whether the current signal frame is a speech frame or a music frame, namely, a local statistical method is applied. This threshold is referred to as a first threshold below.

If the ratio of the signal frames whose var_flux is above or equal to the first threshold to all signal frames buffered in the second buffer array (including the current signal frame) is above a second threshold, the current signal frame is a speech frame; if the ratio is below the second threshold, the current signal frame is a music frame.

In this embodiment, the spectrum fluctuation parameter of the current signal frame is obtained; if the current signal frame is a foreground frame, the spectrum fluctuation parameter of the current signal frame is buffered in the first buffer array; if the current signal frame falls within a first number of initial signal frames, the spectrum fluctuation variance of the current signal frame is set to a specific value, and is buffered in the second buffer array; if the current signal frame falls outside the first number of initial signal frames, the spectrum fluctuation variance of the current signal frame is obtained according to the spectrum fluctuation parameters of all buffered signal frames, and is buffered in the second buffer array. The signal spectrum fluctuation variance serves as a parameter for classifying signals, and the local statistical method is applied to decide the signal type. Therefore, the signals are classified with few parameters, simple logical relations and low complexity.

Figure 4:
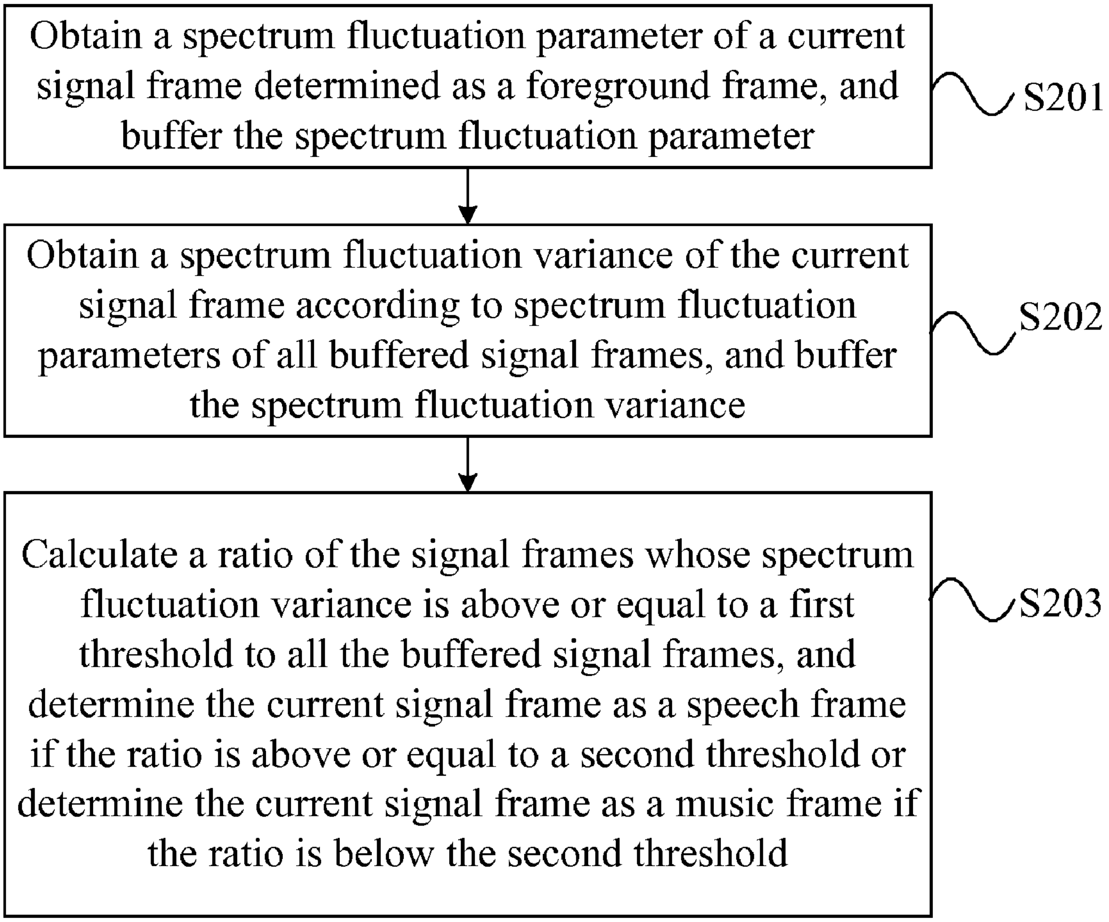
FIG. 4 is a flowchart of a signal classifying method according to another embodiment of the present invention.

FIG. 4 is a flowchart of a signal classifying method in another embodiment of the present invention. As shown in FIG. 4, the method includes the following steps:

S201. Obtain a spectrum fluctuation parameter of a current signal frame determined as a foreground frame, and buffer the spectrum fluctuation parameter.

In this embodiment, an input signal is framed to generate a certain number of signal frames. If the type of a signal frame currently being processed needs to be identified, this signal frame is called a current signal frame. Framing is a universal concept in the digital signal processing, and refers to dividing a long segment of signals into several short segments of signals.

The types of a signal frame include foreground frame and background frame. A foreground frame generally refers to the signal frame with high energy in the communication process, for example, the signal frame of a conversation between two or more parties or signal frame of music played in the communication process such as a ring back tone. A background frame generally refers to the noise background of the conversation or music in the communication process.

The signal classifying in this embodiment refers to identifying the type of the signal in the foreground frame. Before the signal classifying, it is necessary to determine whether the current signal frame is a foreground frame. Meanwhile, it is necessary to obtain the spectrum fluctuation parameter of the current signal frame determined as a foreground frame. The two operations above are not order-sensitive. Any variations of the embodiments of the present invention without departing from the essence of the present invention shall fall within the scope of the present invention.

The method for obtaining the spectrum fluctuation parameter of the current signal frame may be: performing time-frequency transform for the current signal frame to form a signal spectrum, and calculating the spectrum fluctuation parameter (flux) of the current signal frame according to the spectrum of the current signal frame and several previous signal frames.

After the spectrum fluctuation parameter of the current signal frame determined as a foreground frame is obtained, the spectrum fluctuation parameter needs to be buffered. In this embodiment, a spectrum fluctuation parameter buffer array (flux_buf) may be set. The flux_buf array is updated when the signal frame is a foreground frame.

S202. Obtain a spectrum fluctuation variance of the current signal frame according to spectrum fluctuation parameters of all buffered signal frames, and buffer the spectrum fluctuation variance.

In this embodiment, the spectrum fluctuation variance of the current signal frame can be obtained according to spectrum fluctuation parameters of all buffered signal frames no matter whether the first array is full.

After the spectrum fluctuation variance of the current signal frame is obtained, the spectrum fluctuation variance needs to be buffered. In this embodiment, a spectrum fluctuation variance buffer array (var_flux_buf) may be set. The var_flux_buf array is updated when the signal frame is a foreground frame.

S203. Calculate a ratio of the signal frames whose spectrum fluctuation variance is above or equal to a first threshold to all the buffered signal frames, and determine the current signal frame as a speech frame if the ratio is above or equal to a second threshold or determine the current signal frame as a music frame if the ratio is below the second threshold.

In this embodiment, var_flux may be used as a parameter for deciding whether the signal is speech or music. After the current signal frame is determined as a foreground frame, a judgment may be made on the basis of a ratio of the signal frames whose var_flux is above or equal to a threshold to the signal frames buffered in the var_flux_buf array (including the current signal frame), so as to determine whether the current signal frame is a speech frame or a music frame, namely, a local statistical method is applied. This threshold is referred to as a first threshold below.

If the ratio of the signal frames whose var_flux is above or equal to the first threshold to all buffered signal frames (including the current signal frame) is above a second threshold, the current signal frame is a speech frame; if the ratio is below the second threshold, the current signal frame is a music frame.

In the technical solution provided in this embodiment, the spectrum fluctuation parameter of the current signal frame determined as a foreground frame is obtained and buffered; the spectrum fluctuation variance is obtained according to the spectrum fluctuation parameters of all buffered signal frames and is buffered; the ratio of the signal frames whose spectrum fluctuation variance is above or equal to the first threshold to all buffered signal frames is calculated; if the ratio is above or equal to the second threshold, the current signal frame is a speech frame; if the ratio is below the second threshold, the current signal frame is a music frame. The signal spectrum fluctuation variance serves as a parameter for classifying signals, and the local statistical method is applied to decide the signal type. Therefore, the signals are classified with few parameters, simple logical relations and low complexity.

Figure 5:
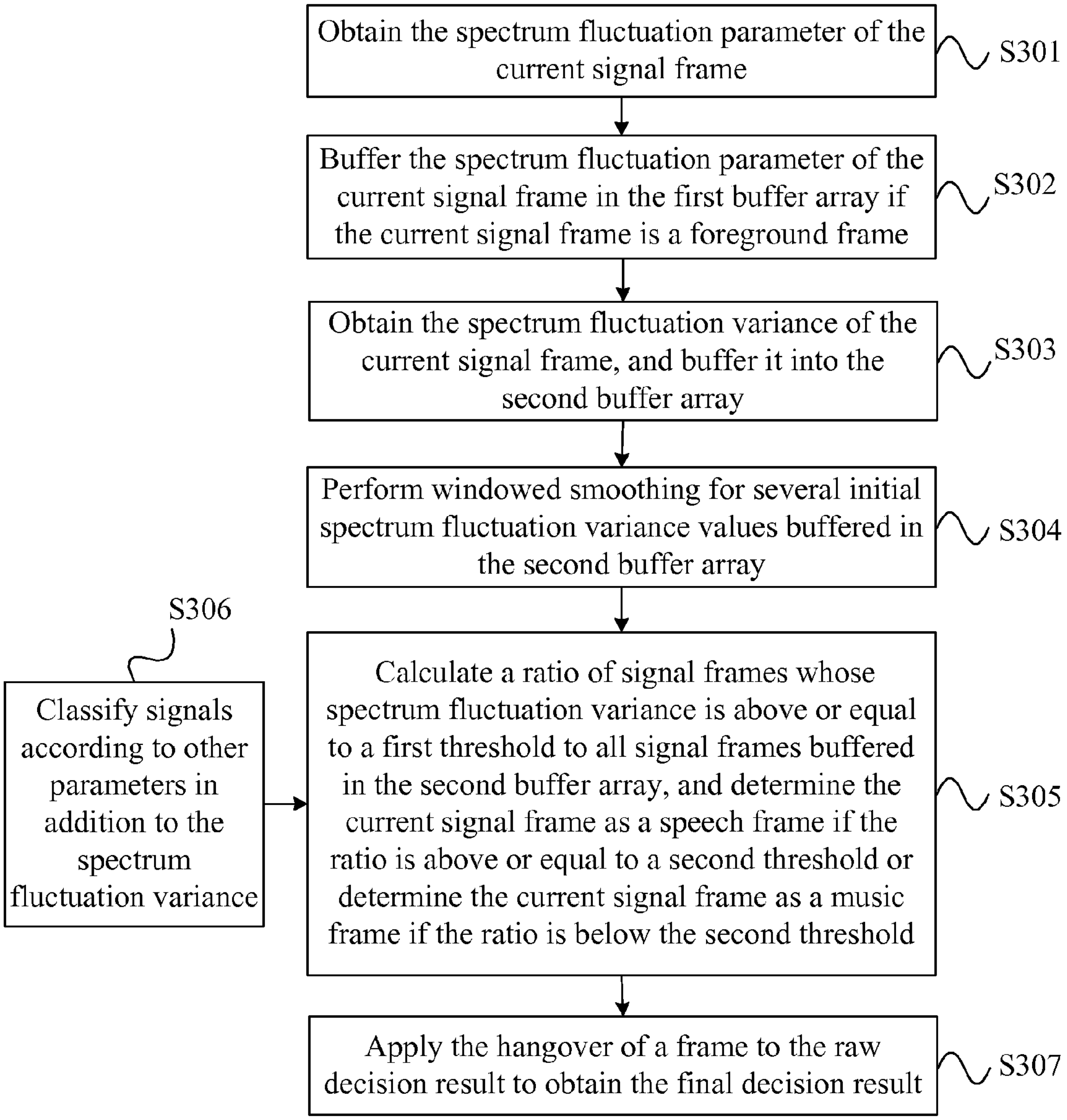
FIG. 5 is a flowchart of a signal classifying method according to another embodiment of the present invention.

FIG. 5 is a flowchart of a signal classifying method in another embodiment of the present invention. As shown in FIG. 5, the method includes the following steps:

S301. Obtain a spectrum fluctuation parameter of a current signal frame.

In this embodiment, an input signal is framed to generate a certain number of signal frames. If the type of a signal frame currently being processed needs to be identified, this signal frame is called a current signal frame. Framing is a universal concept in the digital signal processing, and refers to dividing a long segment of signals into several short segments of signals. The framing is performed in multiple ways, and the length of the obtained signal frame may be different, for example, 5-50 ms. In some implementation, the frame length may be 10 ms.

Under a set sampling rate, each signal frame undergoes time-frequency transform to form a signal spectrum, namely, N1 time-frequency transform coefficients $S_p^n(i)$. $S_p^n(i)$ represents an $i^{th}$ time-frequency transform coefficient of frame n. The sampling rate and the time-frequency transform method may vary. In some implementation, the sampling rate may be 8000 Hz, and the time-frequency transform method is 128-point Fast Fourier Transform (FFT).

The current signal frame undergoes time-frequency transform to form a signal spectrum, and the spectrum fluctuation parameter (flux) of the current signal frame is calculated according to the spectrum of the current signal frame and several previous signal frames. The calculation method is diversified. For example, within a frequency range, the characteristics of the spectrum are analyzed. The number of previous frames may be selected at discretion. For example, three previous frames are selected, and the calculation method is:

$$flux_n = \frac{\sum_{m=1}^{3}\sum_{i=k_1}^{k_2}(S_p^n(i) - S_p^{n-m}(i))}{\sum_{m=1}^{3}\sum_{i=k_1}^{k_2}(S_p^n(i) + S_p^{n-m}(i))}$$

In the formula above, $flux_n$ represents the spectrum fluctuation parameter of frame n; $k_1,k_2$ represents a frequency range determined in a signal spectrum, where $1 \leqq k_1 < k_2 \leqq N_1$, for example, $k_1=2$, $k_2=48$; m represents the number of selected frames before the current signal frame. In the foregoing formula, m is equal to 3.

S302. Buffer the spectrum fluctuation parameter of the current signal frame in a first buffer array if the current signal frame is a foreground frame.

In this embodiment, the types of a signal frame include foreground frame and background frame. A foreground frame generally refers to the signal frame with high energy in the communication process, for example, the signal frame of a conversation between two or more parties or signal frame of music played in the communication process such as a ring back tone. A background frame generally refers to the noise background of the conversation or music in the communication process. The signal classifying in this embodiment refers to identifying the type of the signal in the foreground frame. Before the signal classifying, it is necessary to determine whether the current signal frame is a foreground frame.

If the current signal frame is a foreground frame, the spectrum fluctuation parameter (flux) of the current signal frame needs to be buffered. In this embodiment, a spectrum fluctuation parameter buffer array (flux_buf) may be set, and this array is referred to as a first buffer array below. The buffer array comes in many types, for example, a FIFO array. The flux_buf array is updated when the signal frame is a foreground frame. This array can buffer the flux of $m_1$ signal frames. $m_1$ is an integer above 0, for example, $m_1=20$. For clearer description, $m_1$ is called the first number. That is, the first buffer array can buffer the first number of signal frames.

The foreground frame may be determined in many ways, for example, through a Modified Segmental Signal Noise Ratio (MSSNR) or a Signal to Noise Ratio (SNR), as described below:

Method 1: Determining the Foreground Frame Through an MSSNR:

The MSSNRn of the current signal frame is obtained. If MSSNRn≧alpha1, the current signal frame is a foreground frame; otherwise, the current signal frame is a background frame. MSSNRn represents the modified sub-band SNR of frame n; alpha1 is a set threshold. For clearer description, alpha1 is called a third threshold. alpha1 may be set to any value, for example, alpha1=50.

In this embodiment, MSSNRn may be obtained in many ways, as exemplified below:

1. Calculate the spectrum sub-band energy ($E_i$) of the current signal frame.

The spectrum is divided into w sub-bands ($0 \leqq w \leqq N_1$), and the energy of each sub-band is $E_i$, where i=0, 1, 2, . . . , w−1:

$$E_i = \frac{1}{M_i}\sum_{k=0}^{M_i-1} e_{I+k}$$

In the formula above, $M_i$ represents the number of frequency points in sub-band i; I represents the index of the initial frequency point of sub-band i; $e_{I+k}$ represents the energy of frequency point I+k.

2. Update the long-term moving average $\overline{E_i}$ of $E_i$ in the background frame.

Once the current signal frame is determined as a background frame, $\overline{E_i}$ is updated through:

$$\overline{E_i}=\beta\cdot\overline{E_i}+(1-\beta)\cdot E_i\ i=0,1,2,\ldots w-1$$

In the formula above, β is a decimal between 0 and 1 for controlling the update speed.

3. Calculate $MSSNR_n$.

$$MSSNRn=\sum_{i=0}^{w}\mathrm{MAX}\left(f_i\cdot 10\cdot\log\left(\frac{E_i}{\overline{E_i}}\right),0\right)$$

where, $$f_i=\begin{cases}\mathrm{MIN}(E_i^2/64,1) & \text{if } 2\le i\le w-4\\ \mathrm{MIN}(E_i^2/25,1) & \text{if } i \text{ is any other value}\end{cases}$$

$$MSSNRn=\sum_{i=0}^{w}\mathrm{MAX}\left(f_i\cdot 10\cdot\log\left(\frac{E_i}{\overline{E_i}}\right),0\right)$$

where, $$f_i=\begin{cases}\mathrm{MIN}(E_i^2/64,1), & 2\le i\le w-4\\ \mathrm{MIN}(E_i^2/25,1), & \text{others}\end{cases}$$

Method 2: Determining the Foreground Frame Through an SNR:

The $snr_n$ of the current signal frame is obtained. If $snr_n \geqq alpha2$, the current signal frame is a foreground frame; otherwise, the current signal frame is a background frame. $snr_n$ represents the SNR of frame n; alpha2 is a set threshold. For clearer description, alpha2 is called a fourth threshold. alpha2 may be set to any value, for example, alpha2=15.

In this embodiment, $snr_n$ may be obtained in many ways, as exemplified below:

1. Calculate the spectrum energy (Ef) of the current signal frame.

$$Ef=\frac{1}{Mf}\sum_{k=0}^{Mf-1}e_k$$

In the formula above, $M_f$ represents the number of frequency points in the current signal frame; and $e_k$ represents the energy of frequency point k.

2. Update the long-term moving average $\overline{Ef}$ of Ef in the background frame.

Once the current signal frame is determined as a background frame, $\overline{Ef}$ is updated through:

$$\overline{Ef}=\mu\cdot\overline{Ef}_p+(1-\mu)\cdot Ef$$

In the formula above, μ is a decimal between 0 and 1 for controlling the update speed.

3. Calculate $snr_n$.

$$snr_n=10\cdot\log\left(\frac{Ef}{\overline{Ef}}\right)$$

In this embodiment, the step of obtaining the spectrum fluctuation parameter of the current signal frame and the step of determining the current signal frame as a foreground frame are not order-sensitive. Any variations of the embodiments of the present invention without departing from the essence of the present invention shall fall within the scope of the present invention. In some implementation, the current signal frame is determined as a foreground frame first, and then the spectrum fluctuation parameter of the current signal frame is obtained and buffered. In this case, the foregoing process is expressed as follows:

S301'. Determine the current signal frame as a foreground frame.

S302'. Obtain and buffer the spectrum fluctuation parameter of the current signal frame.

In this case, unlike S301 which obtains the spectrum fluctuation parameter of the current signal frame, S302' obtains the spectrum fluctuation parameter of the current signal frame determined as a foreground frame, and it is not necessary to obtain the spectrum fluctuation parameter of the background frame. Therefore, the calculation and the complexity are reduced.

Alternatively, the current signal frame is determined as a foreground frame first, and then the spectrum fluctuation parameter of every current signal frame is obtained, but only the spectrum fluctuation parameter of the current signal frame determined as a foreground frame is buffered.

S303. Obtain the spectrum fluctuation variance of the current signal frame, and buffer it into the second buffer array.

In this embodiment, a spectrum fluctuation variance $var\_flux_n$ may be obtained according to whether the first buffer array is full, where $var\_flux_n$ is a spectrum fluctuation variance of frame n. If the current signal frame falls within a first number of initial signal frames, the spectrum fluctuation variance of the current signal frame is set to a specific value, and the spectrum fluctuation variance of the current signal frame is buffered in the second buffer array; otherwise, the spectrum fluctuation variance of the current signal frame is obtained according to spectrum fluctuation parameters of all buffered signal frames, and the spectrum fluctuation variance of the current signal frame is buffered in the second buffer array.

If the flux_buf array buffers the first $m_1$ flux values, the $var\_flux_n$ may be set to a specific value, namely, if the current signal frame falls within the first number of initial signal frames, the spectrum fluctuation variance of the current signal frame is set to a specific value such as 0. That is, the spectrum fluctuation variance of frame 1 to frame $m_1$ determined as foreground frames is 0.

If the current signal frame does not fall within the first number of initial signal frames, starting from frame $m_1+1$, the spectrum fluctuation variance $var\_flux_n$ of each signal frame determined as a foreground frame after frame $m_1$ can be calculated according to the flux of the $m_1$ signal frames buffered. In this case, the spectrum fluctuation variance of the current signal frame may be calculated in many ways, as exemplified below:

In the case of buffering the flux $m_1$, the average value $mov\_flux_n$ of the flux is initialized according to the $m_1$ flux values buffered:

$$\mathrm{mov\_flux}_n=\left(\sum_{i=1}^{m_1}flux_i\right)\Big/m_1$$

After the initialization, starting from signal frame $m_1+1$ which is determined as a foreground frame, the mov_flux can be updated once for each foreground frame according to:

$$\text{mov\_flux}_n = \sigma * \text{mov\_flux}_{n-1} + (1-\sigma)\text{flux}_n$$

where σ is a decimal between 0 and 1 for controlling the update speed.

Therefore, starting from signal frame $m_1+1$ which is determined as a foreground frame, the $\text{var\_flux}_n$ can be determined according to the flux of the $m_1$ buffered signal frames inclusive of the current signal frame, namely, $$\text{var\_flux}_n = \sum_{k=1}^{m_1} (flux_{n-k} - \text{mov\_flux}_n)^2,$$

where n is greater than $m_1$.

In some implementation, the spectrum fluctuation variance of frame 1 to frame $m_1$ determined as foreground frames may be determined in other ways. For example, the spectrum fluctuation variance of the current signal frame is obtained according to the spectrum fluctuation parameter of all buffered signal frames, as detailed below:

If the flux_buf array buffers the first s flux values ($1 \leqq s \leqq m_1$), the average values $\text{mov\_flux}_n$ and $\text{var\_flux}_n$ of the flux values are calculated according to:

$$\text{mov\_flux}_n = \left(\sum_{i=1}^{s} flux_i\right) \Big/ s$$

$$\text{var\_flux}_n = \sum_{k=1}^{s} (flux_{n-k} - \text{mov\_flux}_n)^2,$$

where n is greater than s.

In this embodiment, the spectrum fluctuation variance of the current signal frame is obtained according to spectrum fluctuation parameters of all buffered signal frames no matter whether the first buffer array is full.

After the spectrum fluctuation variance of the current signal frame is obtained, the spectrum fluctuation variance needs to be buffered. In this embodiment, a spectrum fluctuation variance buffer array (var_flux_buf) may be set, and this array is referred to as a second buffer array below. The buffer array comes in many types, for example, a FIFO array. The var_flux_buf array is updated when the signal frame is a foreground frame. This array can buffer the var_flux of $m_3$ signal frames. $m_3$ is an integer above 0, for example, $m_3=120$.

S304. Perform windowed smoothing for several initial spectrum fluctuation variance values buffered in the second buffer array.

In some implementation, it is appropriate to perform windowed smoothing for several initial var_flux values buffered in the var_flux_buf array, for example, apply a ramping window to the var_flux of the signal frames that range from frame $m_1+1$ to frame $m_1+m_2$ to prevent instability of a few initial values from affecting the decision of the speech frames and music frames. $m_2$ is an integer above 0, for example, m2=20. The windowing is expressed as:

$$\text{win\_var\_flux}_n = \text{var\_flux}_n * \text{window}$$

where $$\text{window} = \frac{n - m_1}{m_1},$$

$$n = m_1 + 1, m_1 + 2, \ldots, m_1 + m_2.$$

In some implementation, other types of windows such as a hamming window are applied.

S305. Calculate a ratio of signal frames whose spectrum fluctuation variance is above or equal to a first threshold to all signal frames buffered in the second buffer array, and determine the current signal frame as a speech frame if the ratio is above or equal to a second threshold or determine the current signal frame as a music frame if the ratio is below the second threshold.

In this embodiment, var_flux may be used as a parameter for deciding whether the signal is speech or music. After the current signal frame is determined as a foreground frame, a judgment may be made on the basis of a ratio of the signal frames whose var_flux is above or equal to a threshold to all signal frames buffered in the var_flux_buf array (including the current signal frame), so as to determine whether the current signal frame is a speech frame or a music frame, namely, a local statistical method is applied. This threshold is referred to as a first threshold below.

If the ratio of the signal frames whose var_flux is above or equal to the first threshold to all buffered signal frames (including the current signal frame) is above a second threshold, the current signal frame is a speech frame; if the ratio is below the second threshold, the current signal frame is a music frame. The second threshold may be a decimal between 0 and 1, for example, 0.5.

In this embodiment, the local statistical method comes in the following scenarios:

Before the var_flux_buf array is full, for example, when only the $\text{var\_flux}_n$ values of $m_4$ frames are buffered ($m_4<m_3$), and the type of signal frame $m_4$ serving as the current signal frame needs to be determined, it is only necessary to calculate a ratio R of the frames whose var_flux is above the first threshold to all the $m_4$ frames. If R is above or equal to the second threshold, the current signal is a speech frame; otherwise, the current signal is a music frame.

If the var_flux_buf array is full, the ratio R of signal frames whose $\text{var\_flux}_n$ is above the first threshold to all the buffered $m_3$ frames (including the current signal frame) is calculated. If the ratio is above or equal to the second threshold, the current signal frame is a speech frame; otherwise, the current signal frame is a music frame.

In some implementation, if the initial $m_5$ signal frames are buffered, R is set to a value above or equal to the second threshold so that the initial $m_5$ signal frames are decided as speech frames. $m_5$ may be any non-negative integer, for example, $m_5=75$. That is, the ratio R of the signal frames whose spectrum fluctuation variance is above or equal to the first threshold to the buffered initial $m_5$ signal frames (including the current signal frame) is a preset value; starting from signal frame $m_5+1$ which is determined as a foreground frame, the ratio R of the signal frames whose spectrum fluctuation variance is above or equal to the first threshold to the buffered signal frames (including the current signal frame) is calculated according to a formula. In this way, the initial speech signals are prevented from being decided as music signals mistakenly.

Figure 6:
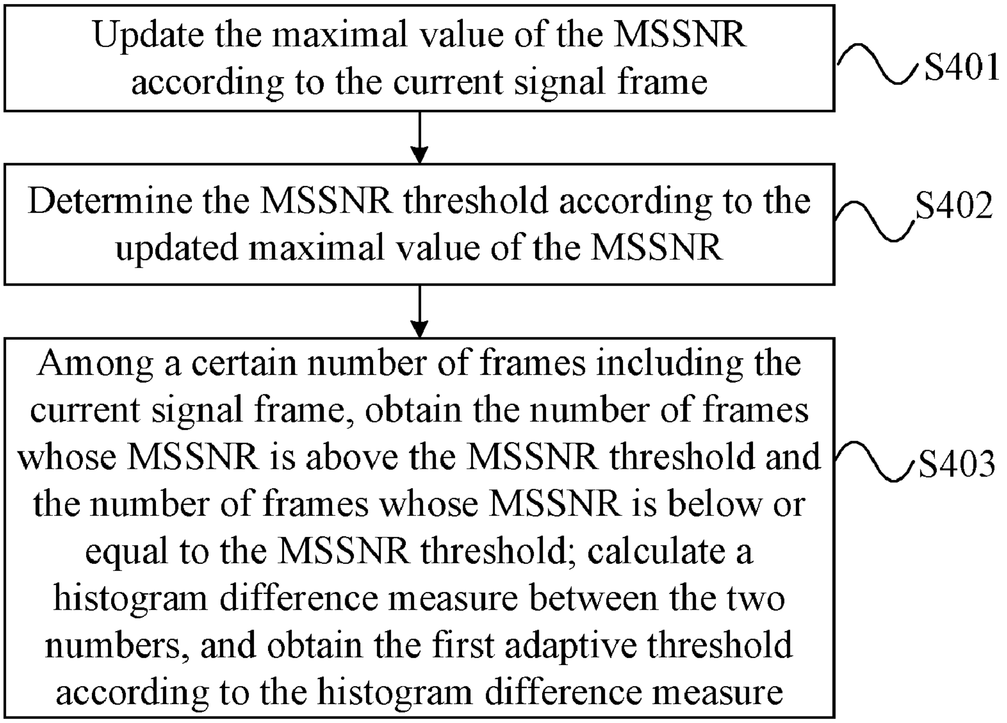
FIG. 6 is a flowchart of obtaining a first adaptive threshold according to an MSSNRn in an embodiment of the present invention.

In this embodiment, the first threshold may be a preset fixed value, or a first adaptive threshold $T_{var\_flux}^{n}$. The fixed first threshold is any value between the maximal value and the minimal value of var_flux. $T_{var\_flux}^{n}$ may be adjusted adaptively according to the background environment, for example, according to change of the SNR of the signal. In this way, the signals with noise can be well identified. $T_{var\_flux}^{n}$ may be obtained in many ways, for example, calculated according to $MSSNR_n$ or $snr_n$, as exemplified below:

Method 1: Determining $T_{var\_flux}^{n}$ according to $MSSNR_n$, as shown in FIG. 6:

S401. Update the maximal value of the MSSNR according to the current signal frame.

The maximal value of $MSSNR_n$, expressed as $max_{MSSNR}$, is determined for each frame. If the $MSSNR_n$ of the current signal frame is above $max_{MSSNR}$, the $max_{MSSNR}$ is updated to the $MSSNR_n$ value of the current signal frame; otherwise, the $max_{MSSNR}$ is multiplied by a coefficient such as 0.9999 to generate the updated $max_{MSSNR}$. That is, the $max_{MSSNR}$ value is updated according to the $MSSNR_n$ of each frame.

S402. Determine the MSSNR threshold according to the updated maximal value of the MSSNR, namely, calculate the adaptive threshold ($T_{MSSNR}$) of $MSSNR_n$ according to the updated $max_{MSSNR}$:

$$T_{MSSNR}=C_{op}*max_{MSSNR}$$

$C_{op}$ is a decimal between 0 and 1, and is adjusted according to the working point, for example, Cop=0.5. The working point is an external input for controlling the tendency of deciding whether the signal is speech or music.

S403. Among a certain number of frames including the current signal frame, obtain the number of frames whose MSSNR is above the MSSNR threshold and the number of frames whose MSSNR is below or equal to the MSSNR threshold; calculate a difference measure between the two numbers, and obtain the first adaptive threshold according to the difference measure.

In this embodiment, $T_{var\_flux}^{n}$ is calculated according to the $MSSNR_n$ value of 1 signal frames which include the current signal frame and 1-1 frames before the current signal frame, where 1 is an integer above 0, for example, 1=512. The detailed method is as follows:

(1) Among the 1 frames, the number of frames with $MSSNR_n > T_{MSSNR}$ is expressed as $high_{bin}$; the number of frames with $MSSNR_n \leqq T_{MSSNR}$ is expressed as $low_{bin}$ namely, $high_{bin}+low_{bin}=l$.

(2) The difference measure between $high_{bin}$ and $low_{bin}$ is expressed as $diff_{hist}$:

$$diff_{hist}=\frac{high_{bin}-low_{bin}}{l}=\frac{2*high_{bin}}{l}-1$$

Depending on the operating point, a corresponding offset factor $\nabla_{op}$ needs to be added to $diff_{hist}$ to generate the difference measure after offset, namely, $$diff_{hist}^{avg}=\rho*diff_{hist}^{avg}+(1-\rho)*diff_{hist}^{bias}$$

(3) The moving average value $diff_{hist}^{avg}$ designed to calculate $diff_{hist}$ of $T_{var\_flux}^{n}$ is:

$$diff_{hist}^{avg}=0.9*diff_{hist}^{avg}+0.1*diff_{hist}^{bias}$$

In the formula above, ρ is a decimal between 0 and 1 for controlling the update speed of $diff_{hist}^{avg}$, for example, ρ=0.9.

(4) $diff_{hist}^{avg}$ needs to fall within a restricted value range between $-X_T$ and $X_T$, where $X_T$ is the upper limit and $-X_T$ is the lower limit. $X_T$ may be a decimal between 0 and 1, for example, $X_T=0.6$. The restricted $diff_{hist}^{avg}$ is expressed as a final difference measure $diff_{hist}^{final}$.

(5) The first adaptive threshold of $var\_flux_n$ is expressed as $T_{var\_flux}^{n}$, which is calculated through:

$$T_{var\_flux}^{n}=A*diff_{hist}^{final}+B$$

where, $$A=\frac{T_{op}^{up}-T_{op}^{down}}{2*X_T}$$

$$B=\frac{T_{op}^{up}+T_{op}^{down}}{2}$$

$T_{op}^{up}$ and $T_{op}^{down}$ are the maximal value and minimal value of $T_{var\_flux}^{n}$ respectively, and are set according to the operating point.

Therefore, the first adaptive threshold of the spectrum fluctuation variance is calculated according to the difference measure, external input working point, and the maximal value and minimal value of the adaptive threshold of the preset spectrum fluctuation variance.

Figure 7:
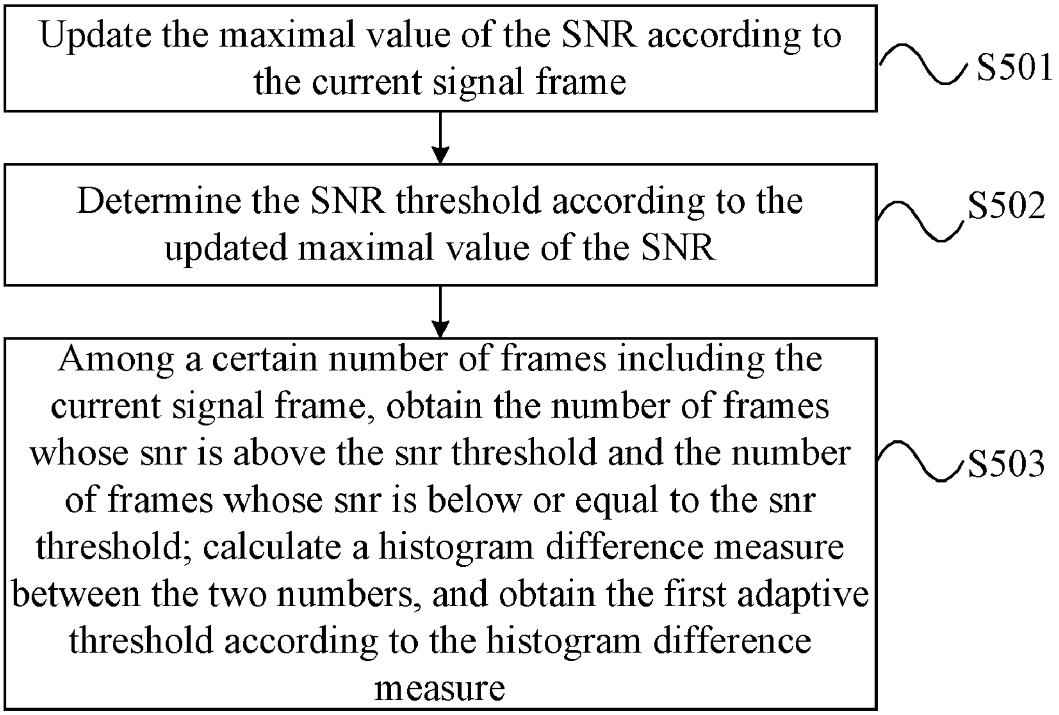
FIG. 7 is a flowchart of obtaining a first adaptive threshold according to an SNR in an embodiment of the present invention.

Method 2: Determining $T_{var\_flux}^{n}$ according to $snr_n$, as shown in FIG. 7:

S501. Update the maximal value of the SNR according to the current signal frame.

The maximal value of $snr_n$, expressed as $max_{snr}$, is determined for each frame. If the $snr_n$ of the current signal frame is above $max_{snr}$, the $max_{snr}$ is updated to the $snr_n$ value of the current signal frame; otherwise, the $max_{snr}$ is multiplied by a coefficient such as 0.9999 to generate the updated $max_{snr}$. That is, the $max_{snr}$ value is updated according to the $snr_n$ of each frame.

S502. Determine the SNR threshold according to the updated maximal value of the SNR, namely, calculate the adaptive threshold ($T_{snr}$) of $snr_n$.

$$T_{snr}=C_{op}*max_{snr}$$

$C_{op}$ is a decimal between 0 and 1, and is adjusted according to the working point, for example, Cop=0.5. The working point is an external input for controlling the tendency of deciding whether the signal is speech or music.

S503. Among a certain number of frames including the current signal frame, obtain the number of frames whose snr is above the snr threshold and the number of frames whose snr is below or equal to the snr threshold; calculate a difference measure between the two numbers, and obtain the first adaptive threshold according to the difference measure.

In this embodiment, $T_{var\_flux}^{n}$ is calculated according to the $snr_n$ value of 1 signal frames which include the current signal frame and 1-1 frames before the current signal frame, where 1 is an integer above 0, for example, 1=512. The detailed method is as follows:

(1) Among the 1 frames, the number of frames with $snr_n > T_{snr}$ is expressed as $high_{bin}$; the number of frames with $snr_n \leqq T_{snr}$ is expressed as $low_{bin}$, namely, $high_{bin}+low_{bin}=l$.

(2) The difference measure between $high_{bin}$ and $low_{bin}$ is expressed as $diff_{hist}$:

$$diff_{hist}=\frac{high_{bin}-low_{bin}}{l}=\frac{2*high_{bin}}{l}-1$$

Depending on the working point, a corresponding offset factor $\nabla_{op}$ needs to be added to $diff_{hist}$ to generate the difference measure after offset, namely, $$diff_{hist}^{bias}=diff_{hist}+\nabla_{op}$$

(3) The moving average value $diff_{hist}^{avg}$ designed to calculate $diff_{hist}$ of $T_{var\_flux}^{n}$ is:

$$diff_{hist}^{avg}=\rho*diff_{hist}^{avg}+(1-\rho)*diff_{hist}^{bias}$$

In the formula above, ρ is a decimal between 0 and 1 for controlling the update speed of $diff_{hist}^{avg}$, for example, ρ=0.9.

(4) $diff_{hist}^{avg}$ needs to fall within a restricted value range between $-X_T$ and $X_T$, where $X_T$ is the upper limit and $-X_T$ is the lower limit. $X_T$ may be a decimal between 0 and 1, for example, $X_T$=0.6. The restricted $diff_{hist}^{avg}$ is expressed as a final difference measure $diff_{hist}^{final}$.

(5) The first adaptive threshold of $var\_flux_n$ is expressed as $T_{var\_flux}^{n}$, which is calculated through:

$$T_{var\_flux}^{n} = A*diff_{hist}^{final} + B$$

where, $$A = \frac{T_{op}^{up} - T_{op}^{down}}{2*X_T}$$

$$B = \frac{T_{op}^{up} + T_{op}^{down}}{2}$$

$T_{op}^{up}$ and $T_{op}^{down}$ are the maximal value and minimal value of $T_{var\_flux}^{n}$ respectively, which are set according to the working point.

Therefore, the first adaptive threshold of the spectrum fluctuation variance is calculated according to the difference measure, external input working point, and the maximal value and minimal value of the adaptive threshold of the preset spectrum fluctuation variance.

S306. Classify signals according to other parameters in addition to the spectrum fluctuation variance.

In some implementation, when var_flux is used as a main parameter for classifying signals, the signal type may be decided according to other additional parameters to further improve the performance of signal classifying. Other parameters include zero-crossing rate, peakiness measure, and so on. In some implementation, peakiness measure $hp_1$ or $hp_2$ may be used to decide the type of the signal. For clearer description, $hp_1$ is called a first peakiness measure, and $hp_2$ is called a second peakiness measure. If $hp_1 \geqq T_1$ and/or $hp_2 \geqq T_2$, the current signal frame is a music frame. Alternatively, the current signal frame is determined as a music frame if: the $avg\_P_1$ obtained according to $hp_1$ is above or equal to $T_1$ or the $avg\_P_2$ obtained according to $hp_2$ is above or equal to $T_2$; or the $avg\_P_1$ obtained according to $hp_1$ is above or equal to $T_1$ and the $avg\_P_2$ obtained according to $hp_2$ is above or equal to $T_2$, as detailed below:

1. Smooth the spectrum ($S_p^n(i)$) of the current signal frame.

$$\begin{cases} lpf\_S_p^n(i) = S_p^n(i) + S_p^n(i-1) & i = 1, \ldots, N_1 - 1 \\ lpf\_S_p^n(0) = S_p^n(0) & i = 0 \end{cases}$$

In the formula above, $lpf\_S_p^n(i)$ represents the smoothed spectrum coefficient.

2. After the smoothing, find x spectrum peak values, expressed as peak(i), where i=0, 1, 2, 3, x−1, and x is a positive integer below $N_1$.

3. Arrange the x peak values in descending order.

4. Select N initial peak(i) values which are relatively great, for example, select 5 initial peak(i) values, and calculate $hp_1$ and $hp_2$ according to the following formulas. If below 5 peak values are found, set N to the number of peak values actually found, and use the N peak values to calculate:

$$hp1 = \frac{\sqrt{\frac{1}{N}\sum_{k=1}^{N} peak^2[k]}}{\frac{1}{N}\sum_{k=1}^{N} |peak[k]|} - 1$$

$$hp2 = \frac{\max(|peak[k]|)}{\frac{1}{N}\sum_{k=1}^{N} |peak[i]|}$$

In the formulas above, N is the number of peak values actually used for calculating $hp_1$ and $hp_2$.

In some implementation, the N peak(i) values may be obtained among the x found spectrum peak values in other ways than the foregoing arrangement; or, several values instead of the initial greater values are selected among the arranged peak values. Any variations made without departing from the essence of the present invention shall fall within the scope of the present invention.

5. If $hp_1 \geqq T_1$ and/or $hp_2 \geqq T_2$, the current signal frame is a music frame, where $T_1$ and $T_2$ are experiential values.

That is, in this embodiment, after $var\_flux_n$ is used as a main parameter for deciding the type of the current signal frame, the parameter $hp_1$ and/or $hp_2$ may be used to make an auxiliary decision, thus improving the ratio of identifying the music frames successfully and correcting the decision result obtained through the local statistical method.

In some implementation, the moving average of $hp_1$ (namely, $avg\_P_1$) and the moving average of $hp_2$ (namely, $avg\_P_2$) are calculated first. If $avg\_P_1 \geqq T_1$ and/or $avg\_P_2 \geqq T_2$, the current signal frame is a music frame, where $T_1$ and $T_2$ are experiential values. In this way, the extremely large or small values are prevented from affecting the decision result.

$avg\_P_1$ and $avg\_P_2$ may be obtained through:

$$avg\_P_1=\gamma*avg\_P_1+(1-\gamma)*hp_1$$

$$avg\_P_2=\gamma*avg\_P_2+(1-\gamma)*hp_2$$

In the formulas above, γ is a decimal between 0 and 1, for example, γ=0.995

The operation of obtaining other parameters and the auxiliary decision based on other parameters may also be performed before S305. The operations are not order-sensitive. Any variations made without departing from the essence of the present invention shall fall within the scope of the present invention.

S307. Apply the hangover of a frame to the raw decision result to obtain the final decision result.

In some implementation, the decision result obtained in step S305 or S306 is called the raw decision result of the current signal frame, and is expressed as SMd_raw. The hangover of a frame is adopted to obtain the final decision result of the current signal frame, namely, SMd_out, thus avoiding frequent switching between different signal types.

Here, last_SMd_raw represents the raw decision result of the previous frame, and last_SMd_out represents the final decision result of the previous frame. If last_SMd_raw=SMd_raw, SMd_out=SMd_raw; otherwise, SMd_out=last_SMd_out. After the final decision is made for every frame, last_SMd_raw and last_SMd_out are updated to the decision result of the current signal frame respectively.

For example, it is assumed that the raw decision result of the previous frame (last_SMd_raw) indicates the previous signal frame is speech, and that the final decision result (last_SMd_out) of the previous frame also indicates the previous signal frame is speech. If the raw decision result of the current signal frame (SMd_raw) indicates that the current signal frame is music, because last_SMd_raw is different from SMd_raw, the final decision result (SMd_out) of the current signal frame indicates speech, namely, is the same as last_SMd_out. The last_SMd_raw is updated to music, and the last_SMd_out is updated to speech.

Figure 8:
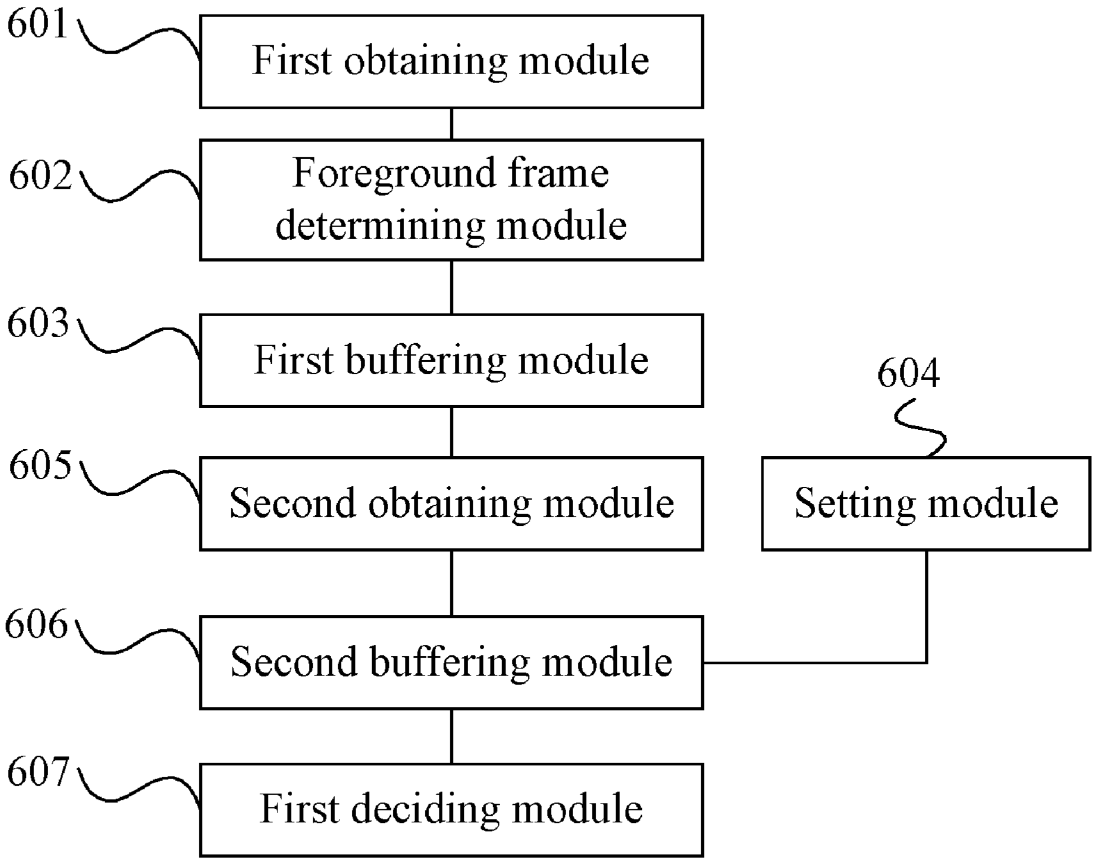
FIG. 8 shows a structure of a signal classifying apparatus according to an embodiment of the present invention.

FIG. 8 shows a structure of a signal classifying apparatus in an embodiment of the present invention. As shown in FIG. 8, the apparatus includes: a first obtaining module 601, configured to obtain a spectrum fluctuation parameter of a current signal frame; a foreground frame determining module 602, configured to determine the current signal frame as a foreground frame and buffer the spectrum fluctuation parameter of the current signal frame determined as the foreground frame into a first buffering module 603; the first buffering module 603, configured to buffer the spectrum fluctuation parameter of the current signal frame determined by the foreground frame determining module 602; a setting module 604, configured to set a spectrum fluctuation variance of the current signal frame to a specific value and buffer the spectrum fluctuation variance in a second buffering module 606 if the current signal frame falls within a first number of initial signal frames; a second obtaining module 605, configured to obtain the spectrum fluctuation variance of the current signal frame according to spectrum fluctuation parameters of all signal frames buffered in the first buffering module 603 and buffer the spectrum fluctuation variance of the current signal frame in the second buffering module 606 if the current signal frame falls outside the first number of initial signal frames; the second buffering module 606, configured to buffer the spectrum fluctuation variance of the current signal frame set by the setting module 604 or obtained by the second obtaining module 605; and a first deciding module 607, configured to: calculate a ratio of signal frames whose spectrum fluctuation variance is above or equal to a first threshold to all signal frames buffered in the second buffering module 606, and determine the current signal frame as a speech frame if the ratio is above or equal to a second threshold or determine the current signal frame as a music frame if the ratio is below the second threshold.

Through the apparatus provided in this embodiment, the spectrum fluctuation parameter of the current signal frame is obtained; if the current signal frame is a foreground frame, the spectrum fluctuation parameter of the current signal frame is buffered in the first buffering module 603; if the current signal frame falls within a first number of initial signal frames, the spectrum fluctuation variance of the current signal frame is set to a specific value, and is buffered in the second buffering module 606; if the current signal frame falls outside the first number of initial signal frames, the spectrum fluctuation variance of the current signal frame is obtained according to the spectrum fluctuation parameters of all buffered signal frames, and is buffered in the second buffering module 606. The signal spectrum fluctuation variance serves as a parameter for classifying signals, and the local statistical method is applied to decide the signal type. Therefore, the signals are classified with few parameters, simple logical relations and low complexity.

Figure 9:
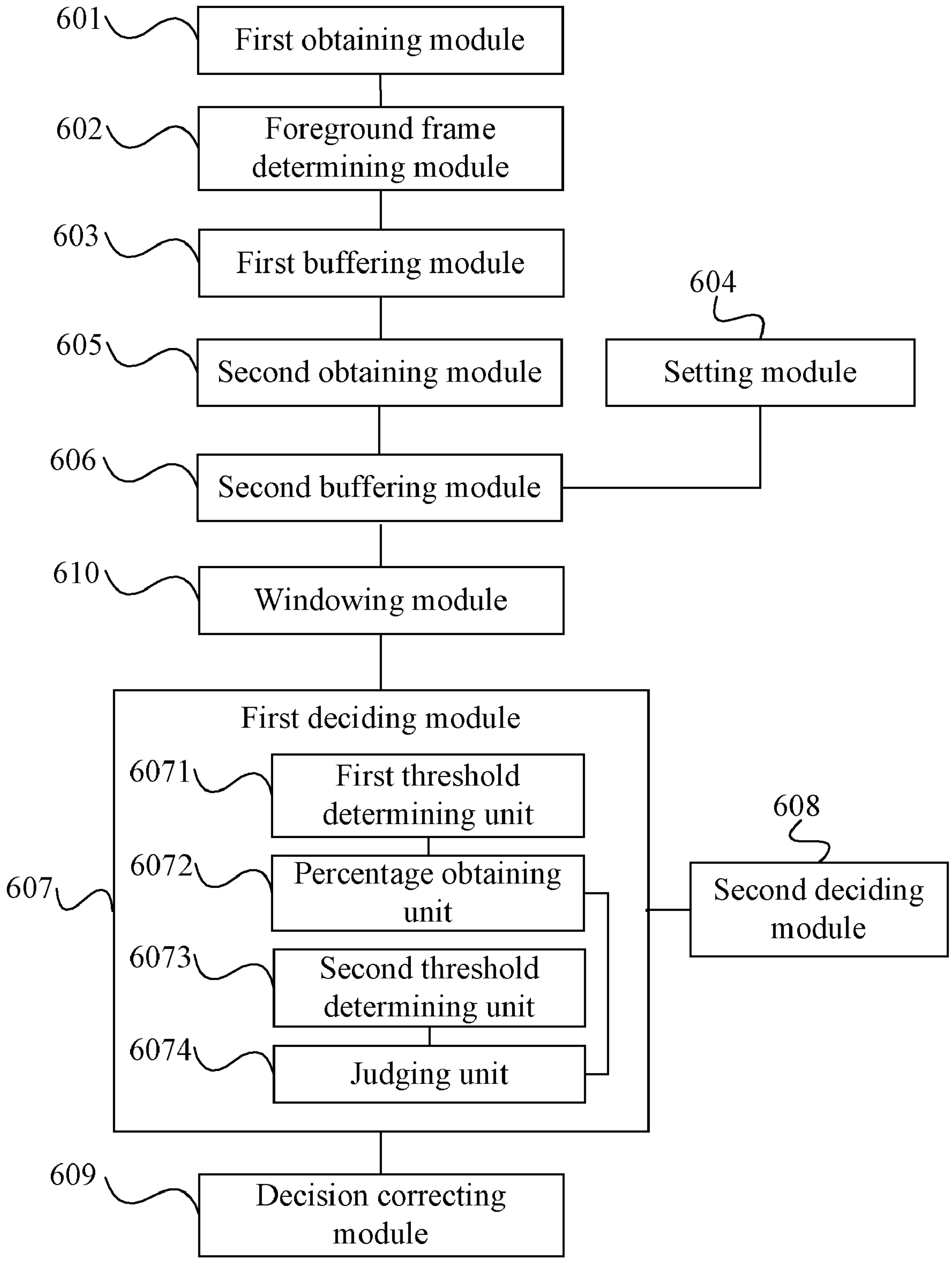
FIG. 9 shows a structure of a signal classifying apparatus according to another embodiment of the present invention.

FIG. 9 shows a structure of a signal classifying apparatus in another embodiment of the present invention. As shown in FIG. 9, the apparatus in this embodiment may include the following modules in addition to the modules shown in FIG. 8: a second deciding module 608, configured to assist the first deciding module 607 in classifying the signals according to other parameters; a decision correcting module 609, configured to obtain a final decision result by applying a hangover of a frame to the decision result obtained by the first deciding module 607 or obtained by both the first deciding module 607 and the second deciding module 608, where the decision result indicates whether the current signal frame is a speech frame or a music frame; and a windowing module 610, configured to: perform windowed smoothing for several initial spectrum fluctuation variance values buffered in the second buffering module 606 before the first deciding module 607 calculates the ratio of the signal frames whose spectrum fluctuation variance is above or equal to the first threshold to all signal frames buffered in the second buffering module 606.

The first deciding module 607 may include: a first threshold determining unit 6071, configured to determine the first threshold; a ratio obtaining unit 6072, configured to obtain the ratio of the signal frames whose spectrum fluctuation variance is above or equal to the first threshold determined by the first threshold determining unit 6071 to all signal frames buffered in the second buffering module 606; a second threshold determining unit 6073, configured to determine the second threshold; and a judging unit 6074, configured to: compare the ratio obtained by the ratio obtaining unit 6072 with the second threshold determined by the second threshold determining unit 6073; and determine the current signal frame as a speech frame if the ratio is above or equal to the second threshold, or determine the current signal frame as a music frame if the ratio is below the second threshold.

The following describes the signal classifying apparatus with reference to the foregoing method embodiments:

The first obtaining module 601 obtains the spectrum fluctuation parameter of the current signal frame. The foreground frame determining module 602 buffers the spectrum fluctuation parameter of the current signal frame into the first buffering module 603 if determining the current signal frame as a foreground frame. The setting module 604 sets the spectrum fluctuation variance of the current signal frame to a specific value and buffers the spectrum fluctuation variance in the second buffering module 606 if the current signal frame falls within a first number of initial signal frames. The second obtaining module 605 obtains the spectrum fluctuation variance of the current signal frame according to spectrum fluctuation parameters of all signal frames buffered in the first buffering module 603 and buffers the spectrum fluctuation variance of the current signal frame in the second buffering module 606 if the current signal frame falls outside the first number of initial signal frames. In some implementation, a windowing module 610 may perform windowed smoothing for several initial spectrum fluctuation variance values buffered in the second buffering module 606. The first deciding module 607 calculates a ratio of signal frames whose spectrum fluctuation variance is above or equal to a first threshold to all signal frames buffered in the second buffering module 606, and determines the current signal frame as a speech frame if the ratio is above or equal to a second threshold or determines the current signal frame as a music frame if the ratio is below the second threshold. In some implementation, the second deciding module 608 may use other parameters than the spectrum fluctuation variance to assist in classifying the signals; and the decision correcting module 609 may apply the hangover of a frame to the raw decision result to obtain the final decision result.

Figure 10:
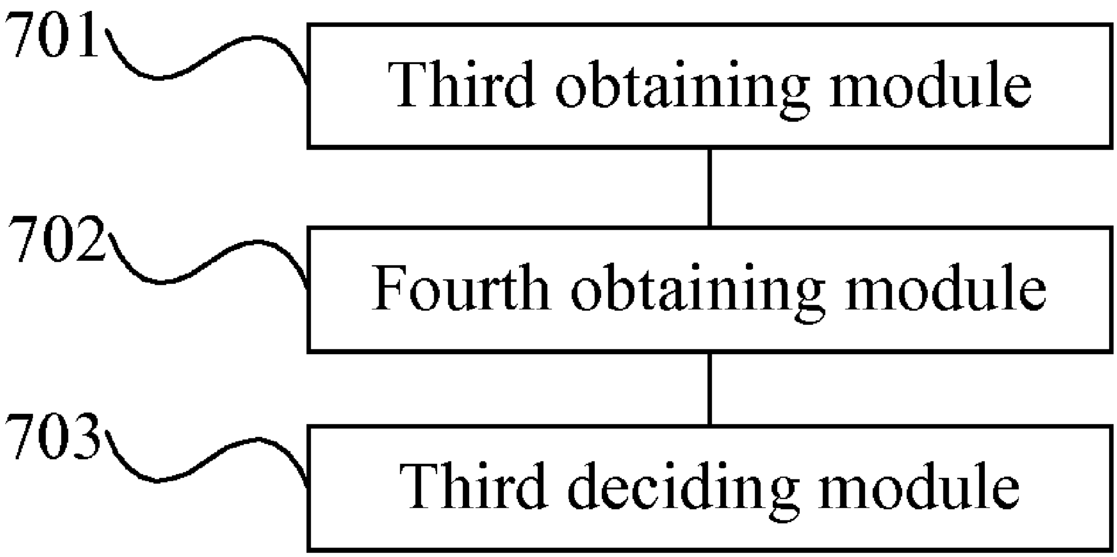
FIG. 10 shows a structure of a signal classifying apparatus according to another embodiment of the present invention.

FIG. 10 shows a structure of a signal classifying apparatus in another embodiment of the present invention. As shown in FIG. 10, the apparatus includes: a third obtaining module 701, configured to obtain a spectrum fluctuation parameter of a current signal frame determined as a foreground frame, and buffer the spectrum fluctuation parameter; a fourth obtaining module 702, configured to obtain a spectrum fluctuation variance of the current signal frame according to the spectrum fluctuation parameters of all signal frames buffered in the third obtaining module 701, and buffer the spectrum fluctuation variance; and a third deciding module 703, configured to: calculate a ratio of signal frames whose spectrum fluctuation variance is above or equal to a first threshold to all signal frames buffered in the fourth obtaining module 702, and determine the current signal frame as a speech frame if the ratio is above or equal to a second threshold or determine the current signal frame as a music frame if the ratio is below the second threshold.

Through the apparatus provided in this embodiment, the spectrum fluctuation parameter of the current signal frame determined as a foreground frame is obtained and buffered; the spectrum fluctuation variance is obtained according to the spectrum fluctuation parameters of all buffered signal frames and is buffered; the ratio of the signal frames whose spectrum fluctuation variance is above or equal to the first threshold to all buffered signal frames is calculated; if the ratio is above or equal to the second threshold, the current signal frame is a speech frame; if the ratio is below the second threshold, the current signal frame is a music frame. The signal spectrum fluctuation variance serves as a parameter for classifying signals, and the local statistical method is applied to decide the signal type. Therefore, the signals are classified with few parameters, simple logical relations and low complexity.

The signal classifying has been detailed in the foregoing method embodiments, and the signal classifying apparatus is designed to implement the signal classifying method above. For more details about the classifying method performed by the signal classifying apparatus, see the method embodiments above.

In the embodiments of the present invention, speech signals and music signals are taken as an example. Based on the methods in the embodiments of the present invention, other input signals such as speech and noise can be classified as well. For the signal classifying based on the local statistical method in the present invention, the spectrum fluctuation parameter and the spectrum fluctuation variance of the current signal frame are used as a basis for deciding the signal type. In some implementation, other parameters of the current signal frame may be used as a basis for deciding the signal type.

Persons of ordinary skill in the art should understand that all or part of the steps of the method according to the embodiments of the present invention may be implemented by a program instructing relevant hardware. The program may be stored in a computer readable storage medium. When the program runs, the steps of the method according to the embodiments of the present invention are performed. The storage medium may be any medium that is capable of storing program codes, such as a Read Only Memory (ROM), a Random Access Memory (RAM), a magnetic disk, or a Compact Disk-Read Only Memory (CD-ROM).

Finally, it should be noted that the above embodiments are merely provided for describing the technical solution of the present invention, but not intended to limit the present invention. It is apparent that persons skilled in the art can make various modifications and variations to the invention without departing from the spirit and scope of the invention. The present invention is intended to cover the modifications and variations provided that they fall within the scope of protection defined by the following claims or their equivalents.

What is claimed is:

1. A signal classifying method, comprising:

obtaining a spectrum fluctuation parameter of a current signal frame;

buffering the spectrum fluctuation parameter of the current signal frame in a first buffer array if the current signal frame is a foreground frame;

if the current signal frame falls within a first number of initial signal frames, setting a spectrum fluctuation variance of the current signal frame to a specific value and buffering the spectrum fluctuation variance of the current signal frame in a second buffer array; otherwise, obtaining the spectrum fluctuation variance of the current signal frame according to spectrum fluctuation parameters of all signal frames buffered in the first buffer array and buffering the spectrum fluctuation variance of the current signal frame in the second buffer array; and calculating a ratio of signal frames whose spectrum fluctuation variance is above or equal to a first threshold to all signal frames buffered in the second buffer array, and determining the current signal frame as a speech frame if the ratio is above or equal to a second threshold or determining the current signal frame as a music frame if the ratio is below the second threshold.

2. The signal classifying method according to claim 1, wherein the first threshold is a first adaptive threshold, and the first adaptive threshold is obtained according to a Modified Segmental Signal Noise Ratio (MSSNR) or a Signal-to-Noise Ratio (SNR).

3. The signal classifying method according to claim 2, wherein obtaining the first adaptive threshold according to the MSSNR comprises:

updating a maximal value of the MSSNR according to the current signal frame;

determining a threshold of the MSSNR according to the updated maximal value of the MSSNR;

obtaining the number of frames whose MSSNR is above the MSSNR threshold and number of frames whose MSSNR is below or equal to the MSSNR threshold among a certain number of frames inclusive of the current signal frame;

calculating a difference measure between the number of frames whose MSSNR is above the MSSNR threshold and the number of frames whose MSSNR is below or equal to the MSSNR threshold; and obtaining the first adaptive threshold according to the difference measure.

4. The signal classifying method according to claim 2, wherein obtaining the first adaptive threshold according to the SNR comprises:

updating a maximal value of the SNR according to the current signal frame;

determining a threshold of the SNR according to the updated maximal value of the SNR;

obtaining the number of frames whose SNR is above the SNR threshold and number of frames whose SNR is below or equal to the SNR threshold among a certain number of frames inclusive of the current signal frame;

calculating a difference measure between the number of frames whose SNR is above the SNR threshold and the number of frames whose SNR is below or equal to the SNR threshold; and obtaining the first adaptive threshold according to the difference measure.

5. The signal classifying method according to claim 1, wherein the method further comprises using other parameters in addition to the spectrum fluctuation variance as a basis for assisting in classifying the signals, which comprises: making an auxiliary decision according to a first peakiness measure and/or a second peakiness measure.

6. The signal classifying method according to claim 1, wherein after obtaining a decision result which indicates that the current signal frame is a speech frame or a music frame, the method further comprises: applying a hangover of a frame to the decision result to obtain a final decision result.

7. The signal classifying method according to claim 1, wherein the method of determining the current signal frame as a foreground frame comprises:

using the MSSNR or the SNR as a basis of the decision; and determining the current signal frame as a foreground frame if the MSSNR is above or equal to a third threshold or the SNR is above or equal to a fourth threshold.

8. The signal classifying method according to claim 1, wherein before obtaining the ratio of signal frames whose spectrum fluctuation variance is above or equal to the first threshold to all the signal frames buffered in the second buffer array, the method further comprises: performing windowed smoothing for several initial spectrum fluctuation variance values buffered in the second buffer array.

9. A signal classifying apparatus, comprising:

a first obtaining module, configured to obtain a spectrum fluctuation parameter of a current signal frame;

a foreground frame determining module, configured to determine the current signal frame as a foreground frame and buffer the spectrum fluctuation parameter of the current signal frame determined as the foreground frame into a first buffering module;

the first buffering module, configured to buffer the spectrum fluctuation parameter of the current signal frame determined by the foreground frame determining module;

a setting module, configured to set a spectrum fluctuation variance of the current signal frame to a specific value and buffer the spectrum fluctuation variance in a second buffering module if the current signal frame falls within a first number of initial signal frames;

a second obtaining module, configured to obtain the spectrum fluctuation variance of the current signal frame according to spectrum fluctuation parameters of all signal frames buffered in the first buffering module and buffer the spectrum fluctuation variance of the current signal frame in the second buffering module if the current signal frame falls outside the first number of initial signal frames;

the second buffering module, configured to buffer the spectrum fluctuation variance of the current signal frame set by the setting module or obtained by the second obtaining module; and a first deciding module, configured to: calculate a ratio of signal frames whose spectrum fluctuation variance is above or equal to a first threshold to all signal frames buffered in the second buffering module, and determine the current signal frame as a speech frame if the ratio is above or equal to a second threshold or determine the current signal frame as a music frame if the ratio is below the second threshold.

10. The signal classifying apparatus according to claim 9, wherein the first deciding module comprises:

a first threshold determining unit, configured to determine the first threshold;

a ratio obtaining unit, configured to obtain the ratio of the signal frames whose spectrum fluctuation variance is above or equal to the first threshold determined by the first threshold determining unit to all the signal frames buffered in the second buffering module;

a second threshold determining unit, configured to determine the second threshold; and a judging unit, configured to: compare the ratio obtained by the ratio obtaining unit with the second threshold determined by the second threshold determining unit; and determine the current signal frame as a speech frame if the ratio is above or equal to the second threshold, or determine the current signal frame as a music frame if the ratio is below the second threshold.

11. The signal classifying apparatus according to claim 9, further comprising: a second deciding module, configured to assist the first deciding module in classifying the signals according to other parameters.

12. The signal classifying apparatus according to claim 9, further comprising: a decision correcting module, configured to obtain a final decision result by applying a hangover of a frame to the decision result obtained by the first deciding module or obtained by both the first deciding module and the second deciding module, wherein the decision result indicates whether the current signal frame is a speech frame or a music frame.

13. The signal classifying apparatus according to claim 9, further comprising: a windowing module, configured to: perform windowed smoothing for several initial spectrum fluctuation variance values buffered in the second buffering module before the first deciding module calculates the ratio of the signal frames whose spectrum fluctuation variance is above or equal to the first threshold to all the signal frames buffered in the second buffering module.

* * * * *